May 27, 1924.

E. KOENEMANN

PULLING MEMBER

Filed April 14, 1923

1,495,228

INVENTOR

Ernst Koenemann

By *Lurie Pamelzke*

Attorney

Patented May 27, 1924.

1,495,228

UNITED STATES PATENT OFFICE.

ERNST KOENEMANN, OF BERLIN-WILMERSDORF, GERMANY.

PULLING MEMBER.

Application filed April 14, 1923. Serial No. 632,094.

*To all whom it may concern:*

Be it known that I, ERNST KOENEMANN, a citizen of Germany, residing at Berlin-Wilmersdorf, Germany, Duisburgerstr. 19, have invented certain new and useful Improvements in Pulling Members, of which the following is a specification.

The use of a belt consisting of leather or a similar friction means to serve as a pulling member for belt pulleys or the like is impaired by the extensibility to which the belt is subjected under the different loads. In order to limit such extensibility the belt must be made very wide, but even then it is necessary to tension the belt from time to time. On the other hand the belt serving as a pulling member offers the advantage, that it completely engages the surface of the pulley at all points of the semi-circumference, and consequently full use can be made of its surface for purposes of power transmission.

Chains serving as means for transmitting power by such drives show the drawback, that they will not engage the circumference of the pulleys as a circle but they engage as a polygon, and in consequence each link of the chain will knock against the surface of the pulley, causing a constant hammering and thus the chain will quickly wear and destroy its usefulness. Furthermore such battering will impair the smooth running of the gear. On the other hand a chain for pulling will show the advantage, that its length will hardly vary under different loads and as compared with a belt can be made very narrow. It may also be constructed in such a manner, that it will admit of a slight lateral movement which is hardly to be dispensed with in gearings having conical drums.

For that purpose driving belts were constructed combined with metal chains and continuous leather belting or similar friction means, to serve as pulling members, in which the chain was arranged at the back of the flat belt and connected with the latter by means of intermediate belts. In a driving belt of this kind the individual flat superposed strips of the belt are subjected to uneven tension, by which a secure connection between the belting and the parts of the chain is not obtained. In consequence of its considerable resistance towards lateral bending the flat arrangement of the belt will admit of no lateral movement of the driving belt, which however is of particular importance in some kinds of belt driving.

In order to overcome these drawbacks, according to the present invention the links of the chain and the belts are placed side to side edge-wise and secured together by means of the articulated bolts of the link chains, through which a reliable and durable connection of the belting with the parts of the chain is assured. Thus only the front faces of the belts will engage the pulleys which will yield an improved frictional contact, but which is much better than the smooth surface of the belt running flat over the pulley. In addition, the strips of belting on account of their adaptability of being easily moved transversely can be utilized for the purpose of attaining an easy lateral movement of the driving belt. Such driving belts in consequence of their combination may also be suitably used for other purposes, as for instance pulling means for winches, lifts and the like.

Some modes of execution of the invention are illustrated in the drawings, in which—

Figure 1:
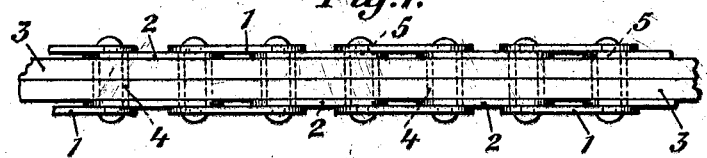
Figure 1 shows a pulling member for a power transmission having cylindrical pulleys.

The pulling member according to Figure 1 consists of the outer link-plates 1, the inner link-plates 2 and the belt strips 3 of leather, rubber or the like. The inner link-plates 2 are connected to each other by means of rigid sleeves 4 and partially surround the strips of belt 3. The outer link-plates 1 are connected to each other by means of rivets 5 which latter keep the various parts of the open link chain in place. The sleeves 4 and the rivets 5 form the links of the link belt and absorb both the pulling force and the bending stress, while the belt strips cause the circular adaptability of the pulling member. The belt strips 3 have a width greater than the outer link plates 1 and the inner link plates 2, so that the pulley is only engaged by the leather or rubber or the like. The sleeves 4 may also be dispensed with, in which case the inner link plates 2 will directly turn on the rivets 5 during the running of the belt.

Figure 2:
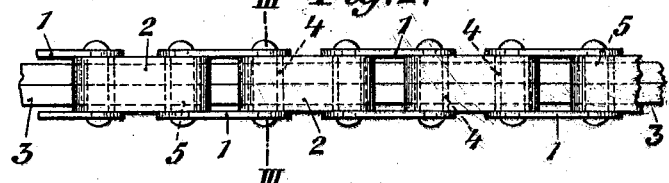
Figure 2 is a like pulling member with the inside block closed at the top.
Figure 3:
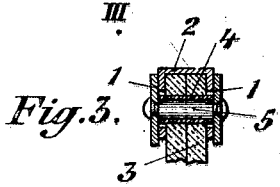
Figure 3 is a section along line III—III through the pulling member of Figure 2.

In Figures 2 and 3 two opposite inner link-plates 2 are formed to present a U-shaped link as may be particularly seen in Figure 3. In this form of construction the belt strips abut against the stud of the U-shaped member and are thus prevented from excessive outward bending on account of the engaging force of the chain on the pulleys.

Figure 4:
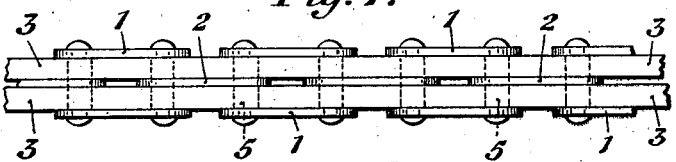
Figure 4 illustrates a pulling member having a large lateral movement.

Figure 4 shows a link chain, which possesses ample lateral movement and ability of turning. This is of particular importance in instances where such a link chain is to transmit power not between cylindrical pulleys, but between conical pulleys, as is the case with a gearing having a varying ratio. Here the inner link plates 2 are situated in the centre of the pulling member between the belt strips 3.

Figure 5:
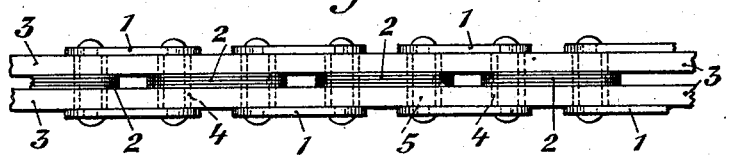
Figure 5 shows a pulling member according to Figure 4 having central link plates consisting of segments.

The link chain according to Figure 5 possesses still greater lateral movement and ability of turning than the link chain according to Figure 4. In this construction the inner link plates 2 are divided into a large number of very thin plates, which act as segments. In this construction therefore the flexibility of the chain is not only obtained by a movement of the rivet 5 in respect of the inner link plate 2 but beyond this also through an elastic torsion of the inner link plates 2 in themselves. Of course, in this belt chain as well as in that according to the other constructions rigid sleeves 4 may be placed on the rivets 5 in order to obtain favorable conditions for frictional contact during the run of the link belt. It may be advantageous to prevent the central link plate 2 from turning on the sleeve 4, in which case the central link plate and the said sleeve are made to turn together on the rivet, by introducing for instance the sleeve into the central link plate by means of a square-head.

Figure 6:
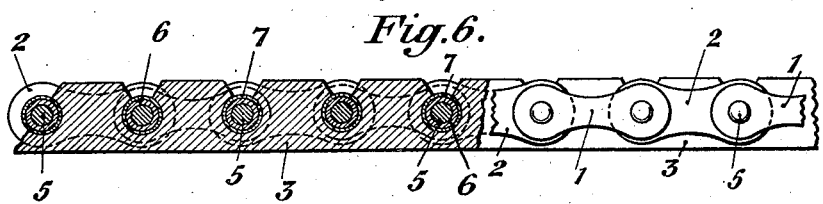
Figure 6 shows a modified form of construction.

Figure 6 shows a construction to be used particularly for the use in rubber belting or similar elastic strips. The rivet 5, the sleeve 6, the roller 7, the inner plate 2 and the outer plate 1 represent the single parts of a common roller chain. Into the chain the rubber band 3 is introduced, which band is running on its level base thus conferring adhesion and circular adaptability to the pulling means. The rubber band 3 is provided with borings for the reception of the roller 7, which are cut into the face of the band opposite the running or engaging surface, so that the rubber band can be inserted into each link in succession, but it is very difficult to push it back again, since the introduced rubber parts each embrace two adjacent rollers.

Instead of the described arrangements it is possible of course to construct further modifications of the pulling member. For instance still further belt strips and chains may be arranged in a like manner parallel to each other.

The pulling members thus obtained present a small width and engage the pulleys like simple belts. The excessive tension of the parts of the belting is prevented in that the pulling force is merely absorbed by the links of the chain or chains.

I claim:
1. A pulling member comprising a plurality of link plates; a plurality of rivets for connecting said plates together; and strips of friction material disposed at right angles to the longitudinal axes of the rivets and having perforations therein, arranged longitudinally between said plates and around said rivets by means of the perforations, said strips projecting beyond the edge of one side of said link plates.

2. A pulling member comprising a plurality of link plates; a plurality of rivets for connecting said plates together; and strips of friction material disposed at right angles to the longitudinal axes of the rivets and having cut-out portions in the engaging surfaces adapted to be inserted between said link plates and around said rivets in order that the engaging surfaces shall project beyond the edge of one side of said link plates.

3. A pulling member comprising a plurality of link plates; a plurality of rivets for connecting said plates together; a sleeve for each rivet; and strips of friction material disposed at right angles to the longitudinal axes of the rivets and having cut-out portions in the engaging surfaces adapted to be inserted between said link plates and around said sleeves in order that the engaging surfaces shall project beyond the edge of one side of said link plates.

In testimony whereof I have affixed my signature.

ERNST KOENEMANN.

Witnesses:
PAUL MASCOCA,
ALFRED TASCHENBERG.